United States Patent
Wang et al.

(10) Patent No.: US 8,412,157 B2
(45) Date of Patent: Apr. 2, 2013

(54) METHOD AND APPARATUS FOR SECURITY PROTECTION OF AN ORIGINAL USER IDENTITY IN AN INITIAL SIGNALING MESSAGE

(75) Inventors: Peter S. Wang, E. Setauket, NY (US); Louis J. Guccione, East Chester, NY (US); Stephen E. Terry, Northport, NY (US)

(73) Assignee: Interdigital Technology Corporation, Wilmington, DE (US)

( * ) Notice: Subject to any disclaimer, the term of this patent is extended or adjusted under 35 U.S.C. 154(b) by 1299 days.

(21) Appl. No.: 11/763,855

(22) Filed: Jun. 15, 2007

(65) Prior Publication Data
US 2007/0297367 A1    Dec. 27, 2007

Related U.S. Application Data

(60) Provisional application No. 60/815,245, filed on Jun. 19, 2006, provisional application No. 60/832,632, filed on Jul. 21, 2006.

(51) Int. Cl.
*H04M 1/66* (2006.01)
(52) U.S. Cl. ........ 455/411; 380/281; 380/282; 380/278; 380/270; 726/5
(58) Field of Classification Search .......... 455/410–411; 380/247, 255, 270–282; 726/5, 51
See application file for complete search history.

(56) References Cited

U.S. PATENT DOCUMENTS

| | | | | |
|---|---|---|---|---|
| 5,680,131 | A * | 10/1997 | Utz | 341/176 |
| 5,889,861 | A | 3/1999 | Ohashi et al. | |
| 5,999,629 | A * | 12/1999 | Heer et al. | 705/51 |
| 6,081,600 | A * | 6/2000 | Blanchard et al. | 380/255 |
| 6,169,802 | B1 * | 1/2001 | Lerner et al. | 380/44 |
| 6,341,220 | B1 | 1/2002 | Hurme | |
| 6,983,376 | B2 * | 1/2006 | Maggenti | 726/5 |
| 7,065,340 | B1 * | 6/2006 | Einola et al. | 455/410 |
| 7,403,621 | B2 * | 7/2008 | Vialen et al. | 380/272 |

(Continued)

FOREIGN PATENT DOCUMENTS

| | | |
|---|---|---|
| EP | 1283618 A2 | 2/2003 |
| EP | 1343267 A2 | 9/2003 |

(Continued)

OTHER PUBLICATIONS

Ericsson, *Test Proposal on PDCP Sublayer for TR 25.813*, Section 5.3.3, 3GPP TSG-RAN WG2x #53, R2-061716, (Shanghai, China May 2006).

(Continued)

*Primary Examiner* — Jinsong Hu
*Assistant Examiner* — Nathan Taylor
(74) *Attorney, Agent, or Firm* — Condo Roccia LLP

(57) ABSTRACT

A wireless transmit/receive unit (WTRU) includes a control plane (C-plane) packet data convergence protocol (C-PDCP) layer which performs ciphering of a signaling message. The C-PDCP layer is activated upon power up of the WTRU and initial security parameters are loaded to the C-PDCP layer. An initial connection signaling message and a user identity are ciphered using the initial security parameters even before the WTRU is authenticated. The initial security parameters including a ciphering key (CK) may be generated from system information broadcast from the network. The CK may be a public key for asymmetric encryption, and may be selected from a public key set broadcast by or derived from the network system information. An index of the selected public key may be separately encoded. Alternatively, the index may be communicated by using a Diffie-Hellman key exchange method.

68 Claims, 5 Drawing Sheets

U.S. PATENT DOCUMENTS

| | | | | |
|---|---|---|---|---|
| 2002/0066011 | A1* | 5/2002 | Vialen et al. | 713/150 |
| 2002/0187808 | A1* | 12/2002 | Vallstrom et al. | 455/558 |
| 2003/0031322 | A1* | 2/2003 | Beckmann et al. | 380/278 |
| 2003/0044011 | A1* | 3/2003 | Vialen et al. | 380/201 |
| 2003/0051041 | A1 | 3/2003 | Kalavade et al. | |
| 2003/0072450 | A1* | 4/2003 | Maggenti | 380/270 |
| 2003/0120685 | A1* | 6/2003 | Duncombe et al. | 707/200 |
| 2004/0088539 | A1* | 5/2004 | Infante et al. | 713/153 |
| 2004/0148352 | A1* | 7/2004 | Menon et al. | 709/205 |
| 2004/0151154 | A1 | 8/2004 | Wu | |
| 2004/0162065 | A1* | 8/2004 | Chun et al. | 455/422.1 |
| 2006/0141987 | A1 | 6/2006 | De Groot | |
| 2006/0182280 | A1* | 8/2006 | Laitinen et al. | 380/247 |

FOREIGN PATENT DOCUMENTS

| | | |
|---|---|---|
| GB | 2380267 A | 4/2003 |
| GB | 2 398 974 | 9/2004 |
| JP | H08-195741 A | 7/1996 |
| JP | 2006-500842 A | 1/2006 |
| RU | 2204219 C2 | 5/2003 |
| WO | WO 00/02358 A1 | 1/2000 |
| WO | 2005/045649 | 5/2005 |

OTHER PUBLICATIONS

Ericsson, *Security Handling for NAS Signaling and User Plane Data*, TSG-RAN WG2 Meeting #53, R2-061412, (Shanghai, China May 2006).

Nokia, *Discussion of Threats Against eNB and Last-mile in Long Term Evolved RAN/3GPP System Architecture Evolution*, 3GPP TSG-SA WG3 Security—S3#42, S3-060034, (Bangalore, India Feb. 2006).

Third Generation Partnership Project, "Technical Specification Group Radio Access Network; Evolved Universal Terrestrial Radio Access (E-UTRA) and Evolved Universal Terrestrial Radio Access Network (E-UTRAN); Radio Interface Protocol Aspects (Release 7)," 3GPP TR 25.813 V0.8.5 (May 2006).

Third Generation Partnership Project, "Technical Specification Group Radio Access Network; Evolved Universal Terrestrial Radio Access (E-UTRA) and Evolved Universal Terrestrial Radio Access Network (E-UTRAN); Radio Interface Protocol Aspects (Release 7)," 3GPP TR 25.813 V1.0.1 (Jun. 2006).

Third Generation Partnership Project, "Technical Specification Group Radio Access Network; Evolved Universal Terrestrial Radio Access (E-UTRA) and Evolved Universal Terrestrial Radio Access Network (E-UTRAN); Radio Interface Protocol Aspects (Release 7)," 3GPP TR 25.813 V7.1.0 (Sep. 2006).

Third Generation Partnership Project, "Technical Specification Group Services and System Aspects; 3G Security; Security Architecture (Release 1999)," 3GPP TS 33.102 V3.13.0 (Dec. 2002).

Third Generation Partnership Project, "Technical Specification Group Services and System Aspects; 3G Security; Security Architecture (Release 4)," 3GPP TS 33.102 V4.5.0 (Dec. 2002).

Third Generation Partnership Project, "Technical Specification Group Services and System Aspects; 3G Security; Security Architecture (Release 5)," 3GPP TS 33.102 V5.5.0 (Sep. 2004).

Third Generation Partnership Project, "Technical Specification Group Services and System Aspects; 3G Security; Security Architecture (Release 5)," 3GPP TS 33.102 V5.7.0 (Dec. 2005).

Third Generation Partnership Project, "Technical Specification Group Services and System Aspects; 3G Security; Security Architecture (Release 6)," 3GPP TS 33.102 V6.5.0 (Dec. 2005).

Third Generation Partnership Project, "Technical Specification Group Services and System Aspects; 3G Security; Security Architecture (Release 7)," 3GPP TS 33.102 V7.0.0 (Dec. 2005).

Third Generation Partnership Project, "Technical Specification Group Services and System Aspects; 3G Security; Security Architecture (Release 7)," 3GPP TS 33.102 V7.1.0 (Dec. 2006).

3GPP, *3rd Generation Partnership Project; Technical Specification Group Services and System Aspects; 3G Security; Security Architecture (Release 5)*, 3GPP TS 33.102 V5.5.0 (Sep. 2004).

Chinese Patent Application No. 200780023070.2: Rejection Dated Nov. 9, 2010, 4 pages.

Korean Patent Application No. 10-2009-7000966: Rejection Dated Oct. 25, 2010, 4 pages.

3rd Generation Partnership Project (3GPP), S3-040256, "Proposal about the efficient mechanism for the setup of the UE-initiated tunnels (Scenario 3) in WLAN interworking", ETRI, 3GPP TSG SA WG3 Security—S3#33, Beijing, China, May 10-14, 2004, 4 pages.

3rd Generation Partnership Project (3GPP), TR 25.813 V0.8.3, "3rd Generation Partnership Project; Technical Specification Group Radio Access Network; Evolved Universal Terrestrial Radio Access (E-UTRA) and Evolved Universal Terrestrial Radio Access Network (E-UTRAN); Radio interface protocol aspects (Release 7)", Apr. 2006, 34 pages.

3rd Generation Partnership Project (3GPP), TR 25.912 V0.2.0, "3rd Generation Partnership Project; Technical Specification Group Radio Access Network; Feasibility Study for Evolved UTRA and UTRAN (Release 7)", Jun. 2006, 5 pages.

* cited by examiner

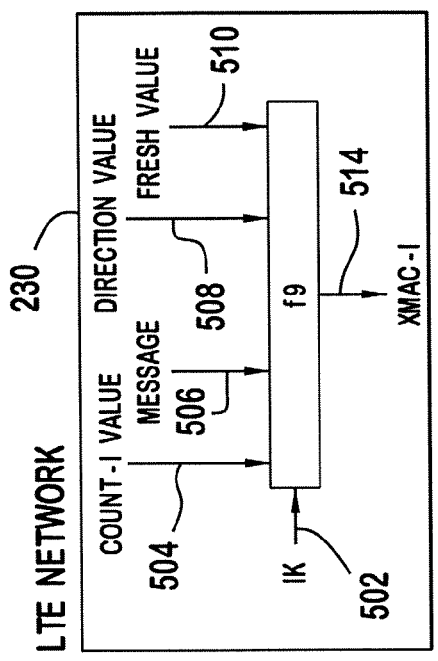
FIG. 5
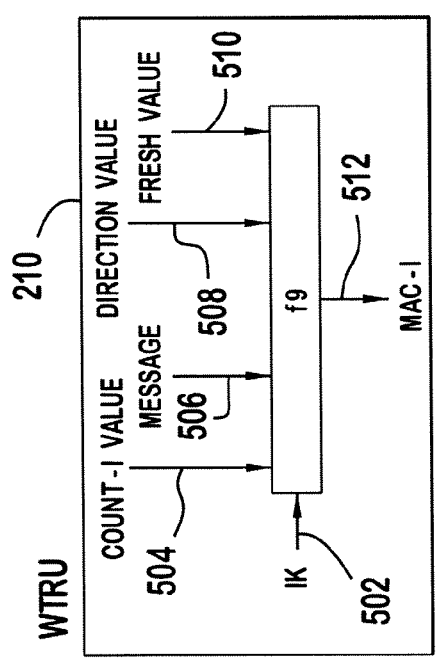
FIG. 5
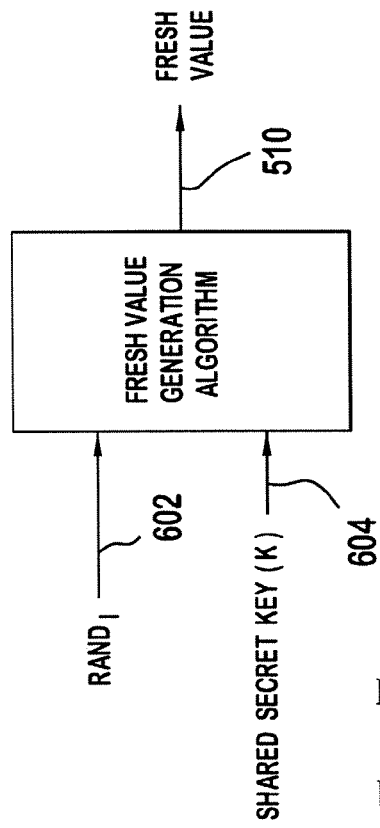
FIG. 7
FIG. 6

METHOD AND APPARATUS FOR SECURITY PROTECTION OF AN ORIGINAL USER IDENTITY IN AN INITIAL SIGNALING MESSAGE

CROSS REFERENCE TO RELATED APPLICATIONS

This application claims the benefit of U.S. Provisional Application Nos. 60/815,245 filed Jun. 19, 2006 and 60/832,632 filed Jul. 21, 2006, which are incorporated by reference as if fully set forth.

FIELD OF INVENTION

The present invention is related to wireless communication systems. More particularly, the present invention is related to a method and apparatus for security protection of an original user identity (ID) in an initial access signaling message in a wireless communication system including third generation (3G) long term evolution (LTE).

BACKGROUND

In a third generation (3G) universal mobile telecommunication system (UMTS), during an initial connection for attachment and authentication procedure, a wireless transmit/receive unit (WTRU) identity, (i.e., international mobile subscriber identity (IMSI)), is transmitted via a radio interface to a core network for authentication purposes. However, the IMSI and some messages exchanged during the initial connection for attachment and authentication procedure are not protected, but transmitted in an open environment unprotected.

FIG. 1 shows an initial attachment and authentication procedure in a 3G UMTS network 10. Upon power up of a WTRU 12, a non-access stratum (NAS) layer 14 of the WTRU 12 sends a signal (ATTACH) to a radio resource control (RRC) layer 16 of the WTRU 12 to trigger an RRC connection (step 102). The RRC layer 16 sends an RRC connection request to a universal terrestrial radio access network (UTRAN) 18 with a WTRU initial identity, (i.e., IMSI), to establish an RRC connection (step 104). The UTRAN 18 responds with an RRC setup request message (step 106). The RRC layer 16 sends an RRC setup complete message to the UTRAN 18 (step 108). The RRC layer 16 then sends a layer 3 message (INITIAL DIRECT TRANSFER) to the UTRAN 18 (step 110). The UTRAN 18 then sends an INITIAL UE MESSAGE with the IMSI to a visitor location register (VLR) 20, (or serving general packet radio services (GPRS) support node (SGSN)) (step 112). A user is identified with the use of the IMSI. Under certain conditions, (e.g., if the user has not been authenticated), the VLR/SGSN 20 requires an authentication and key agreement (AKA) and sends an authentication data request to a home location register (HLR) 22, (or authentication center (AuC)), (step 114). Upon receipt of the authentication data request, the HLR/AuC 22 sends a set of authentication vectors (AVs) to the VLR/SGSN 20 (step 116).

Each AV contains a quintet of numbers that includes a random number (RAND), an expected response (XRES) which is used to authenticate the user, a cipher key (CK) for establishing confidentiality, an integrity key (IK), and an authentication token (AUTN). The AUTN comprises a sequence number (SQN) hidden by an anonymity key (AK), an authentication management field (AMF) which specifies certain authentication components, (such as algorithms to be used, key lifetime, etc.), and a message authentication code (MAC) which is functionally dependent on the SQN, the AMF, and the RAND.

The VLR/SGSN 20 sends the RAND and the AUTN from the AV that it has selected to the NAS layer 14 via the UTRAN 18 (steps 118, 120). The NAS layer 14 then authenticates the network by calculating an expected MAC (XMAC) and determining whether the XMAC matches the MAC (step 122). The NAS layer 14 also computes session security keys to the WTRU 12, (i.e., the CK and IK in the AV) at step 122. The key generation is performed using predefined UMTS algorithms which take RAND as input and apply the shared secret key K.

The NAS layer 14 computes a response (RES) and sends the RES to the VLR/SGSN 20 via the UTRAN 18 (steps 124, 126). The VLR/SGSN 20 determines if the RES matches the XRES to authenticate the WTRU 12 (step 128). An authentication failure occurs if either of these authentication attempts fails at steps 122 and 128. Once mutual authentication has succeeded, the VLR/SGSN 20 sends an authentication complete message to the HLR/AuC 22 (step 130) and a local security activation procedure starts.

The VLR/SGSN 20 sends a security mode command to the UTRAN 18 including the negotiated UMTS encryption algorithms (UEAs) and UMTS integrity algorithms (UIAs), and the current session keys, CK and IK (step 132). As secure communication can now begin the UTRAN 18 sends a security mode command to the RRC layer 16 with a message authentication code for integrity (MAC-I) (step 134). The MAC-I value protects the integrity of the security mode command message. The MAC-I is a type of hash computed by a UIA on the message's contents using the session key IK.

The RRC layer 16 sends a security mode indicator to the NAS layer 14 (step 136) and the NAS layer 14 loads security session keys IK and CK to the RRC layer 16 (step 138). The RRC integrity protection entity verifies the integrity of the received message by calculating a MAC-I in a similar manner, using the UIA with the IK on the security mode command message's contents, and comparing it to the received MAC-I. The RRC layer 16 also loads the CK to an RLC ciphering entity to start ciphering (step 140). If the authentication codes match, the RRC layer 16 sends a security mode complete message to the UTRAN 18 (step 142). The VLR/SGSN 20 sends an attach accept message to the NAS layer 12 (step 144).

For the process illustrated in FIG. 1, the RRC connection request message with the IMSI, the RRC setup request message, the RRC setup complete message, the initial direct transfer message with an optional IMSI, the authentication request message and the authentication response message are not protected, but transmitted in an open environment unprotected. The fact that the important WTRU identity, (i.e., IMSI), is sent over the air unprotected provokes an "IMSI catching threat." The caught IMSI could be used by a malignant denial of service (DoS) attack or other possible attacks to the network and users.

Therefore, it would be desirable to provide a method and system for protecting initial control signaling messages and especially the WTRU identity, (i.e., IMSI), during the initial connection for attachment and authentication procedure

SUMMARY

The present invention is related to a method and apparatus for security protection of an original user identity in an initial access signaling message in a wireless communication system including third generation (3G) LTE. A WTRU includes a control plane (C-plane) packet data convergence protocol (C-PDCP) layer which performs ciphering and integrity protection of a signaling message. The C-PDCP layer is activated upon power up of the WTRU and initial security parameters are loaded to the C-PDCP layer. An initial connection signaling message for network attachment, and a user ID, (e.g., an IMSI), are ciphered using the initial security parameters even before the WTRU is authenticated. The initial security parameters are loaded from a universal subscriber identity module (USIM) and generated from system information broadcast from the network. The system information includes a public key set with at least one public key for asymmetric encryption of the IMSI or information from which the public key(s) can be derived. The initial security parameters for ciphering include a CK. The CK may be a public key or may be selected from the public key set broadcast by or derived from the network system information. An index of the selected public key may be separately encoded. Alternatively, the index may be communicated by using a Diffie-Hellman key exchange method.

BRIEF DESCRIPTION OF THE DRAWINGS

A more detailed understanding of the invention may be had from the following description of a preferred embodiment, given by way of example and to be understood in conjunction with the accompanying drawings wherein:

FIG. 5 shows conventional f9 integrity protection process and parameters;

FIG. 6 shows generation of the IK using f4 algorithm with a random number (RAND) and a shared secret key (K) in accordance with the present invention; and FIG. 7 shows an example of generation of the FRESH value with the RAND and the shared secret key K.

DETAILED DESCRIPTION OF THE PREFERRED EMBODIMENTS

When referred to hereafter, the terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "eNode-B" includes but is not limited to a base station, a site controller, an access point (AP), or any other type of interfacing device capable of operating in a wireless environment.

Figure 1:
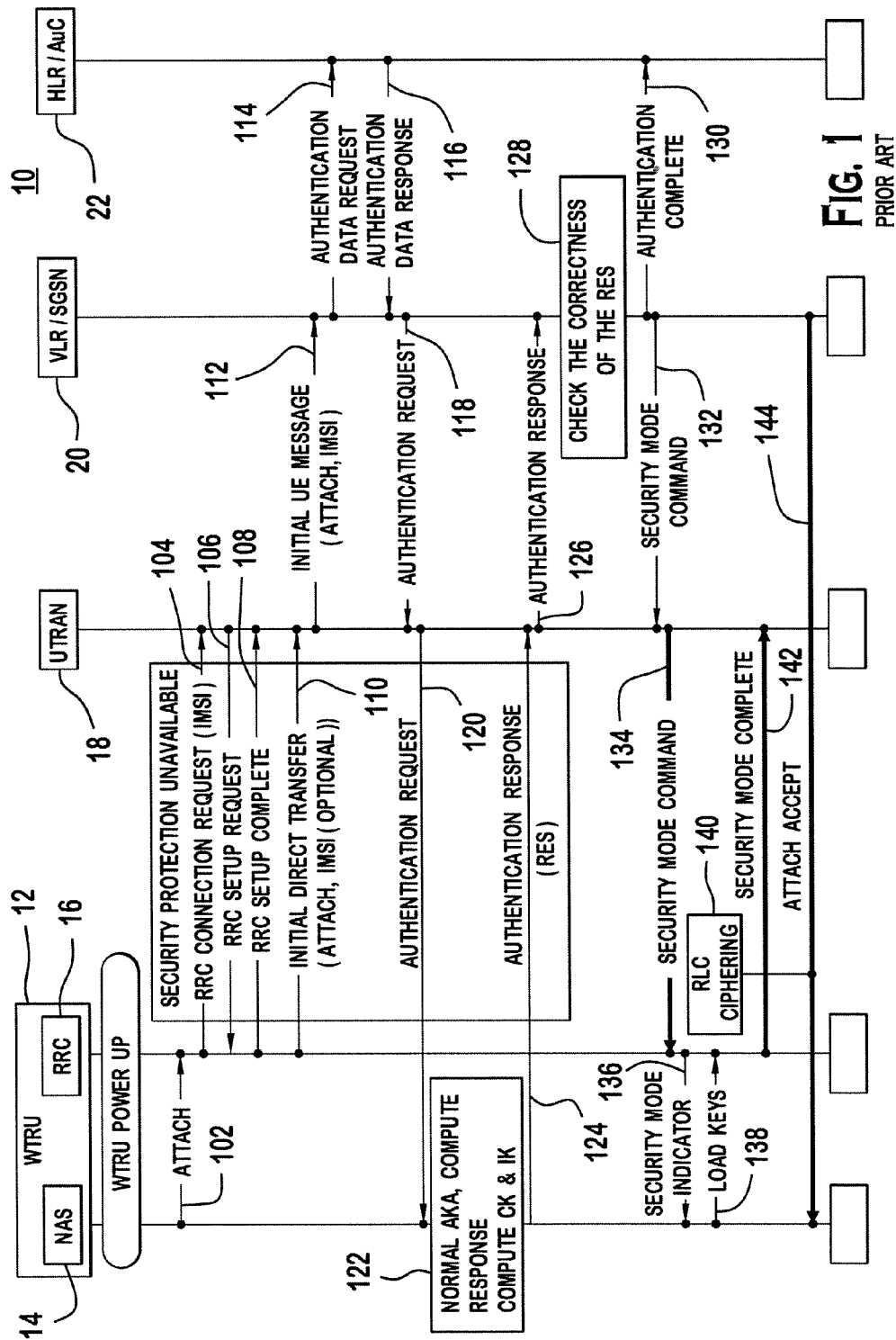
FIG. 1 shows an initial attachment and authentication procedure in a 3G UMTS network.
Figure 2:
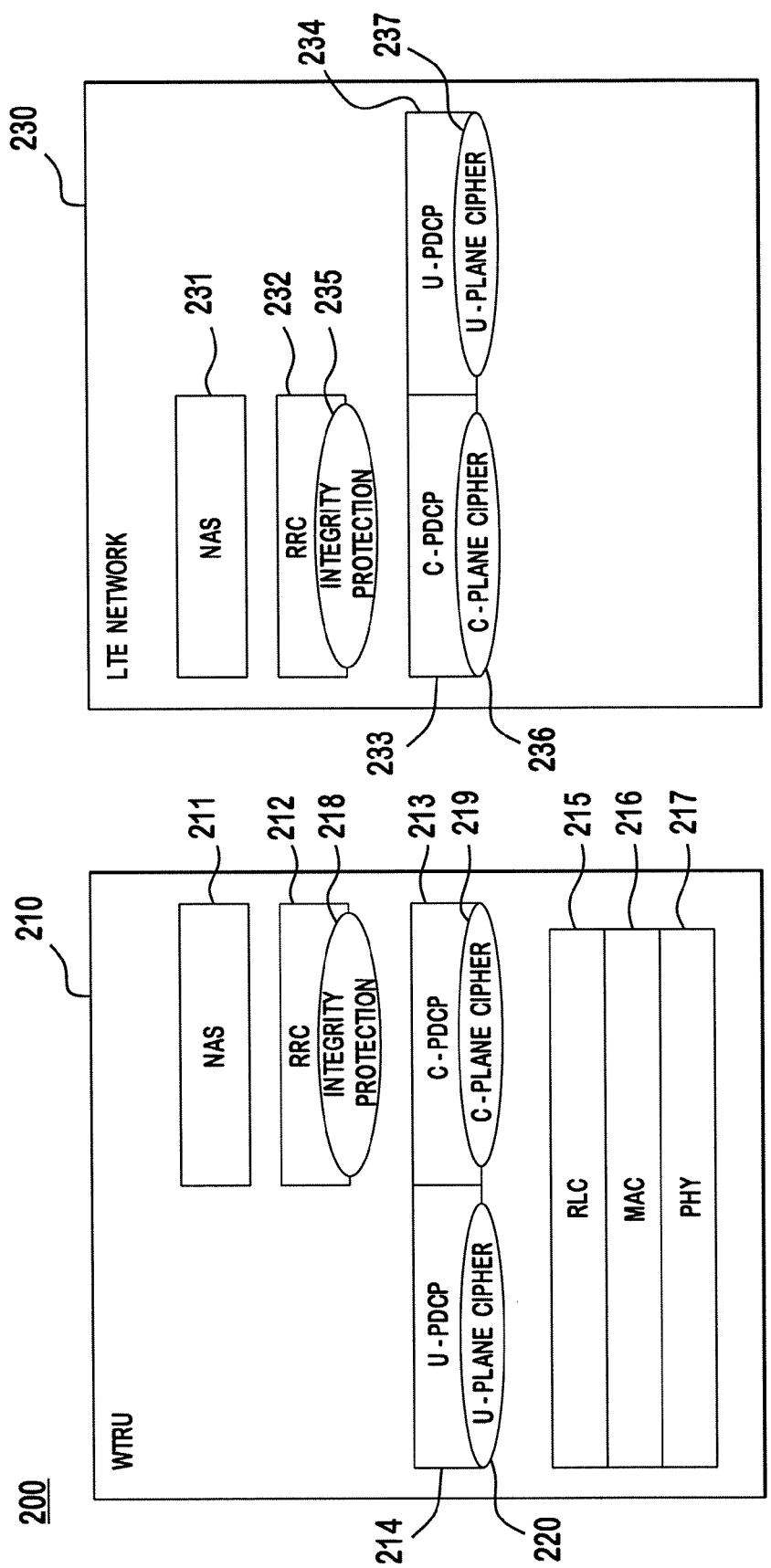
FIG. 2 shows a wireless communication system in accordance with the present invention.

FIG. 2 shows a wireless communication system 200 in accordance with the present invention. The system 200 includes a WTRU 210 and an LTE network 230. The WTRU 210 includes a non-access stratum (NAS) layer 211, an RRC layer 212, a C-PDCP layer 213, a U-plane PDCP (U-PDCP) layer 214, and lower layers including an RLC layer 215, a medium access control layer 216 and a physical layer 217. The RRC layer 212 includes an integrity protection entity 218. The C-PDCP layer 213 includes a C-plane cipher entity 219 and the U-PDCP layer 214 includes a U-plane cipher entity 220. The LTE network 230 includes an NAS layer 231, an RRC layer 232, a C-PDCP layer 233, and a U-PDCP layer 234. The RRC layer 232 includes an integrity protection entity 235. The C-PDCP layer 233 includes a C-plane cipher entity 236 and the U-PDCP layer 234 includes a U-plane cipher entity 237. In a C-plane, the RRC layers 212 and 232 are responsible for integrity protection, and the C-PDCP layers 213 and 233 are responsible for ciphering of the NAS/RRC control signaling messages, while in a U-plane the U-PDCP layers 214 and 234 are responsible for Internet protocol (IP) header compression and ciphering.

In accordance with the present invention, the C-PDCP layers 213 and 233 perform ciphering of the previously unprotected initial NAS signaling messages and WTRU IMSI transmission. Otherwise, it is transparent to control signaling messages. The present invention provides methods for initial loading and generation of security parameters, encryption key arrangements between the WTRU 210 and a network, IMSI encryption, and WTRU signaling adjustment for the IMSI encryption for the initial NAS signaling messages, which will be explained in detail hereinafter.

Figure 3:
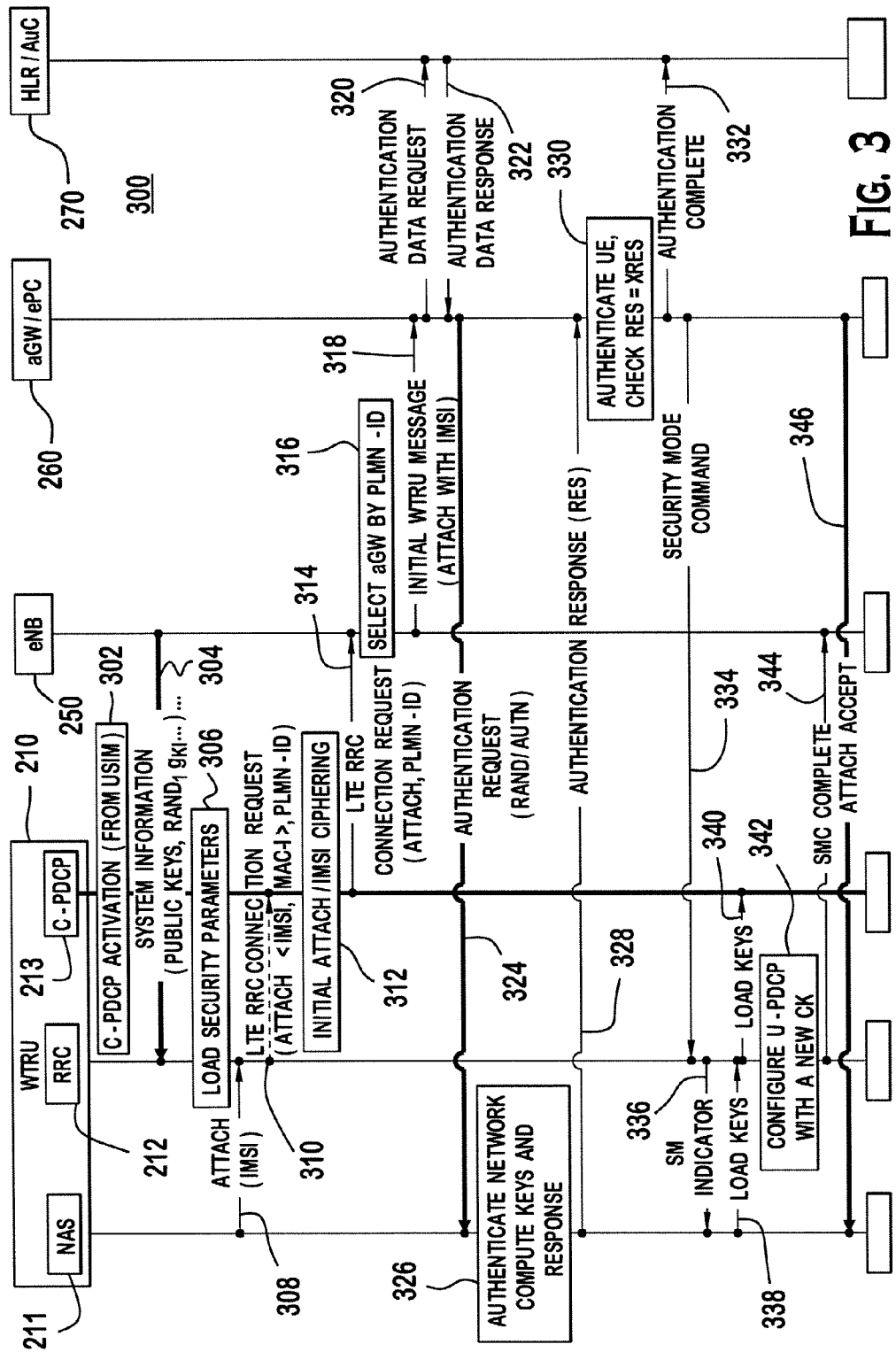
FIG. 3 is a signaling diagram of a process for attachment and authentication in accordance with the present invention.

FIG. 3 is a signaling diagram of a process 300 for attachment and authentication in accordance with the present invention. Upon WTRU power up, the C-PDCP layer 213 of the WTRU 210 is activated (step 302). The RRC layer 212 receives system information broadcast by an eNode-B 250 and forwards it to the C-PDCP layer 213 (step 304). The system information includes information for the initial security parameters including, but not limited to, a public key(s) or key derivation information, a random number(s) (RAND(s)) and/or a key seed $g_{KI}$.

Initial security parameters are loaded into the C-PDCP layer 213 at step 306, which will be explained in detail hereinafter. The C-PDCP initial security parameter loading is mainly from a universal subscriber identity module (USIM) of the WTRU 210 where consistent security parameters and runtime values for the WTRU 210 are updated and stored. The C-PDCP initial security parameter may additionally be from the system information broadcast from the eNode-B 250, which may include the public key information. The initial security parameters for ciphering include a CK and an IK. The CK may be a public key or may be selected from the public key set broadcast by or derived from the network system information. The C-PDCP layer 213 is ready to operate, (i.e., ready to perform cipher/decipher when a first NAS/RRC signaling message, (e.g., an ATTACH or those messages triggered by it), is to be transmitted even before the WTRU 210 is authenticated.

The NAS layer 211 triggers an RRC connection by sending an attach message along with an IMSI to the RRC layer 212 (step 308). The RRC layer 212 sends an LTE RRC connection request to the C-PDCP layer 213 including the attach message and MAC-I and preferably a public land mobile network (PLMN) identity (ID) (step 310). The C-PDCP layer 213 then performs ciphering on the attach message and the IMSI with the initial CK (from USIM or system information broadcast), and sends an LTE RRC connection request message including ciphered attach message and IMSI along with the MAC-I from the RRC layer 212 (steps 312, 314). Unlike the conventional attachment procedure, the attach message and the IMSI are protected with initial CK and IK.

The LTE RRC connection request message may also include a second seed, $g_{FRESH}$, for Diffie-Hellman key exchange, which will be explained in detail hereinafter. The eNode-B 250 selects an appropriate aGW 260 based on the PLMN ID included in the connection request message (step 316). The eNode-B 250 forwards the attach message with the IMSI to the selected aGW 260 (step 318).

If the user has not been authenticated, the aGW 260 sends an authentication data request to an HLR 270, (or AuC) (step 320). Upon receipt of the authentication data request, the HLR/AuC 270 sends an authentication data response including a set of authentication vectors (AVs) to the aGW 260 (step 322).

The aGW 260 sends an authentication request message to the NAS layer 211 of the WTRU 210 including the RAND and the AUTN from the first AV (step 324). The connection response message does not have to be ciphered or integrity protected. Alternatively, the connection response message may be ciphered at the eNode-B 250 with a public key with an index from the HLR/AuC 270 with the conventional symmetric ciphering algorithm. The NAS layer 211 then authenticates the network by calculating an expected MAC (XMAC) and determining whether the XMAC matches the MAC (step 326). The NAS layer 211 also computes new session keys, (i.e., CK and IK in the AV) at step 326. The key generation is performed using predefined algorithms which take RAND as input and apply the shared secret key K.

The NAS layer 211 computes a response (RES) and sends an authentication response message including the RES to the aGW 260 (step 328). The authentication response message may optionally be protected with the initial CK and/or IK. The aGW 260 determines if the RES matches the XRES to authenticate the WTRU 210 (step 330). An authentication failure occurs if either of these authentication attempts fails at steps 326 and 330. Once mutual authentication has succeeded, the aGW 260 sends an authentication complete message to the HLR/AuC 270 (step 332).

The aGW 260 sends a security mode command message to the RRC layer 212 of the WTRU 210 (step 334). The RRC layer 212 sends a security mode indicator to the NAS layer 211 (step 336). The NAS layer 211 loads session keys to the RRC layer 212 (step 338) and to the C-PDCP layer 213 (step 340). The RRC layer 212 then configures a U-PDCP layer (not shown in FIG. 3) with a new CK for U-plane ciphering (step 342). The RRC layer 212 verifies the integrity of the received security mode command message by calculating a MAC-I using the IK on the security mode command message's contents, and comparing the calculated MAC-I to the received MAC-I. If they match, the RRC layer 212 sends a security mode complete message to the eNode-B 250 (step 344). The aGW 260 sends an attach accept message to the NAS layer 211 (step 346) and secure communication, (ciphering, deciphering, and integrity protection), begins.

Initial loading of ciphering parameters at step 306 is explained hereinafter. Ciphering algorithm to be used is one of the parameters to be selected. An initial ciphering algorithm may be an asymmetric encryption algorithm and a default ciphering algorithm later may be a symmetric algorithm such as the f8 algorithm. However, any other ciphering algorithm may be used. Hereinafter, the present invention will be explained with reference to f8 algorithm parameters for illustration purpose.

Figure 4:
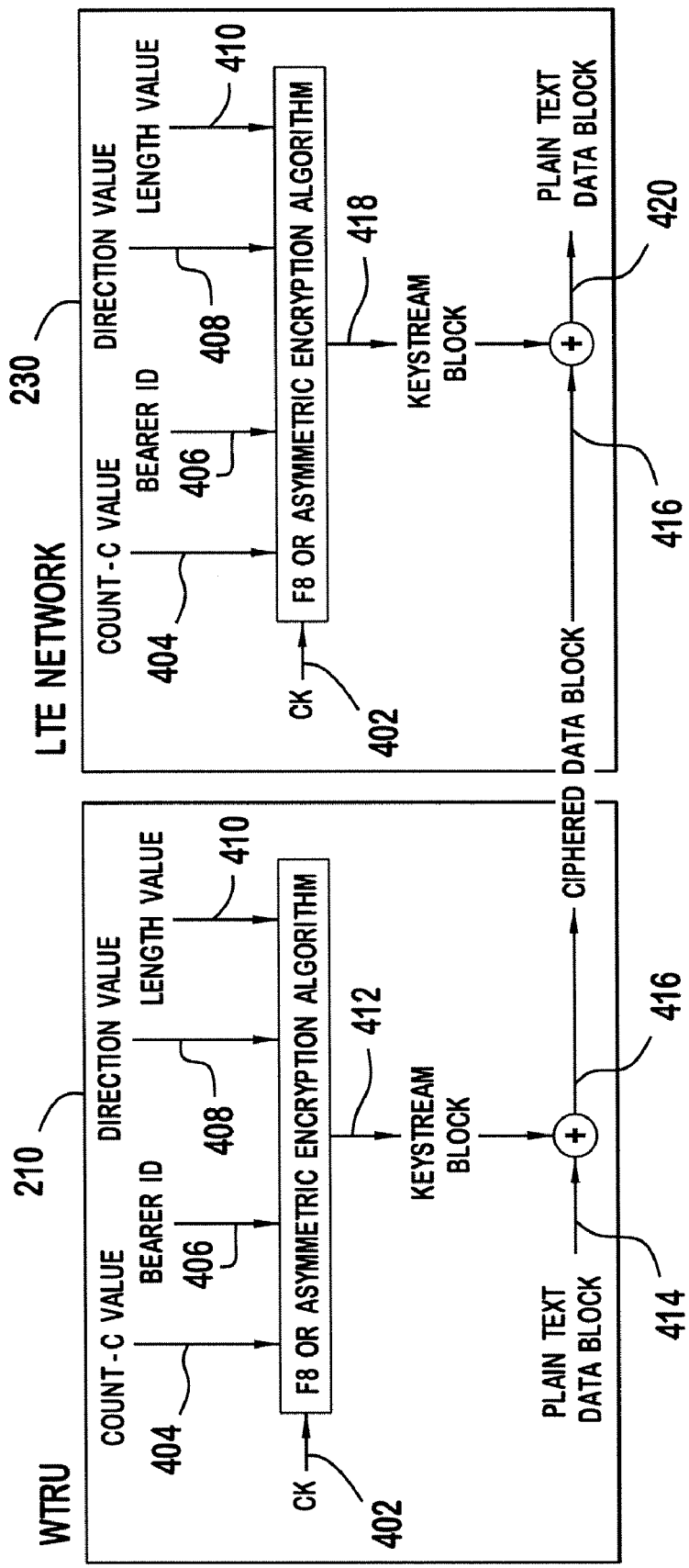
FIG. 4 shows a ciphering process including conventional f8 ciphering and ciphering parameters.

FIG. 4 shows a ciphering process including conventional f8 ciphering and ciphering parameters. The ciphering algorithm may be a conventional symmetric ciphering algorithm such as f8 or an asymmetric encryption algorithm used for the ciphering with public and private keys. The ciphering parameters necessary for the f8 algorithm include CK 402, COUNT-C value 404, Bearer ID 406, Direction value 408, and Length value 410. The WTRU 210 generates a keystream block 412 using the f8 algorithm and adds the keystream block 412 to an unciphered plain text input data block 414 to generate a ciphered data block 416, which is transmitted to the network 230. The network 230 also generates a keystream block 418 using the same f8 algorithm and same parameters and adds the generated keystream block 418 to the received ciphered data block 416 to recover the plain text data block 420. The ciphering parameters for the asymmetric encryption algorithm may have at least the CK 402 for the public/private key pair and may have other parameters.

The CK 402 may be a public/private key-pair in an asymmetric encryption system. The WTRU 210 uses the public key for ciphering the whole or a part of the uplink NAS message and/or the whole or a part of the RRC initial access message including the IMSI, and the network 230 deciphers the ciphered NAS message with a corresponding private key. The CK 402 may be a pre-arranged public/private key between the WTRU 210 and the network 230. Alternatively, the public key may be broadcast via the system information. The network 230 may broadcast only one public key, or a set of n public keys, $(k_1, \ldots, k_n)$ or information for key derivation.

If a set of public keys are broadcast, the WTRU 210 selects one from the public key set. In selecting the public key, the WTRU 210 may use the FRESH value to compute an index into the public key set, (e.g., the index a=FRESH % n) to select the initial CK 402. Alternatively, the WTRU 210 may use its IMSI value for the key index, (i.e., the index a=IMSI % n) to select the initial CK 402. With this scheme, the randomness of the key usage is increased and it becomes more difficult for security attackers.

Since the network 230 does not know the FRESH value before the IMSI has been correctly decoded and, as a result, cannot independently calculate the index of the selected public key, information about the selected public key should be communicated between the WTRU 210 and the network 230. The WTRU 210 may include the index of the selected public key in the NAS message. For example, the WTRU 210 encodes the index a of the selected public key with a pre-agreed public key, (say $k_1$), and the rest of the NAS or RRC message including the IMSI with the selected public key $k_a$. The network 230 first decodes the index a, and then decodes the whole message with the selected public key $k_a$ including the IMSI.

Alternatively, the public key may be selected using a Diffie-Hellman key exchange method. The LTE network 230 and the WTRU 210 agree on two values, (a very large prime number p and a generator g of the multiplicative group $F_p^*$ of the field $F_p$), that are publicly known. The LTE network 230 broadcasts via system information a set of public keys with a first seed, $g_{KI}$ (where a randomly selected KI is such that $1 \leq K \leq p-2$ and $g_{KI} \equiv g^{KI}$ mod p). The set of public keys may be from a larger group of encryption keys with random periodicity and order. The WTRU 210 randomly selects a value KIn2, $(1 \leq KIn2 \leq p-2)$, to compute a second seed, $g_{KIn2} \equiv g^{KI2}$ mod p. The WTRU 210 then computes $k' \equiv (g_{KI})^{KIn2}$ mod p. The public key index a=k' mod n, where n is the current number of public keys broadcast from the system information with the first seed, $g_{KI}$. The computed a is an index to the public key set for the chosen public key $k_a$. The WTRU 210 ciphers the NAS or the RRC message including the IMSI with the selected public $k_a$ and includes the second seed, $g_{KIn2}$, in the NAS or RRC message to the LTE network 230. The second seed is not encrypted. The LTE network 230 first takes the unencrypted second seed, $g_{KIn2}$, and computes $k \equiv (g_{KIn2})^{KI}$ mod p. The index a is then obtained by a≡k mod n for the private key index a. The LTE network 230 then decodes the whole message with the private key corresponding to public key $k_a$.

The COUNT-C value 404 may be a pre-arranged value known only to the WTRU 210 and the LTE network 230 at the initial stage. Alternatively, the COUNT-C value 404 may be the START value (or an equivalent) stored in the USIM and its network counterpart combined with other values known only between the WTRU 210 and the LTE network 230, (e.g., NAS message sequence number). Alternatively, the COUNT-C value 404 may be a computed value by the WTRU 210 and the LTE network 230 as in the case of FRESH value derivation.

The Bearer ID 406 may be the configured radio bearer ID value of the channel such as '3' for signaling radio bearer 3 (SRB-3). Alternatively, the Bearer ID 406 may be some pre-arranged value. The Direction value 408 is set to '0' for uplink. The Length value 410 is the NAS or RRC message (including the IMSI) length in unit of a bit.

Initial loading of integrity protection parameters at step 306 is explained hereinafter. The initial integrity protection can help combat the denial of service attack. Integrity protection algorithm to be used is one of the parameters to be selected. A default integrity protection algorithm may be f9 algorithm. However, any other integrity protection algorithm may be used. Hereinafter, the present invention will be explained with reference to f9 algorithm for illustration purpose.

FIG. 5 shows conventional f9 integrity protection process and parameters. The parameters necessary for the f9 algorithm include IK 502, COUNT-I value 504, Message 506, Direction value 508, and FRESH value 510. The WTRU 210 uses the initial IK 502 to generate an MAC-I 512 for the first NAS/RRC message and sends the generated MAC-I 512 to the network 230 along with the NAS/RRC message. The LTE network 230 generates an expected MAC-I (XMAC-I) 514 with the same parameters 502-510 and compares the received MAC-I 512 and the XMAC-I 514 to verify the message integrity after it has decoded the IMSI for the WTRU 210.

The IK 502 may be generated by the WTRU 210 (and the network 230) at the initial C-PDCP activation and configuration using a RAND value received from the system information. For example, the IK 502 may be generated by using f4 algorithm with a random number (RAND) 602 and a shared secret key (K) 604 as shown in FIG. 6. Given the secret key K 604, which is shared between the WTRU 210 and the network 230 via IMSI, the generated IK 502 bears affinity to the unique association between the WTRU 210 and the network 230. It, in turn, enables the MAC-I generated by the integrity protection algorithm f9 bearing the signature of a particular WTRU.

The COUNT-I value 504 may be a pre-arranged value known only to the WTRU 210 and the network 230 at the initial stage. Alternatively, the COUNT-I value 504 may be set to the START value (or an equivalent) stored in the USIM and its network counterpart combined with other values known only between the WTRU 210 and the network 230, (e.g., the NAS message sequence number). Alternatively, the COUNT-I value 504 may be a computed value by the WTRU 210 and the network 230 as in the case of FRESH value derivation.

The Message parameter 506 may be the NAS/RRC message itself with the radio bearer identity appended in front of the message. The Direction value 508 is set to a certain value, (e.g., '0'), for uplink. The FRESH value 510 may be selected from a set of pre-arranged FRESH values (FRESH$_0$, FRESH$_1$, ..., FRESH$_{n-1}$) between the WTRU 210 and the network 230, using the IK to compute the index m, (e.g., m=IK % n). Alternatively, the FRESH value 510 may be generated by using a FRESH value generation algorithm with the RAND 602 and the shared secret key 604 as input, as shown in FIG. 7.

Initial loading of these security parameters enables the C-PDCP layer 212 to enter an operational state when the first NAS signal message is to be transmitted from the WTRU 210. This also enables the C-PDCP layer 212 to decipher subsequent incoming and outgoing NAS signaling messages, if necessary. The C-PDCP layer 212 may switch to the security parameters generated from the normal AKA procedure when it is successfully performed.

The present invention is also applicable to the downlink NAS message encryption in the initial stage before AKA completion. In order to have the downlink encryption work before AKA, the LTE network 230 needs to encrypt the NAS/RRC message using the same "public key" (given the network has all the public/private keys and also knowing the key-index) that the WTRU 210 has used for the first uplink message/IMSI and the encryption algorithm needs to be a symmetric algorithm such as f8.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for security protection of a user identity (ID) in an initial connection signaling message, the method comprising:
   activating a control plane (C-plane) packet data convergence protocol (C-PDCP) layer upon power up of a wireless transmit/receive unit (WTRU);
   generating initial security parameters from system information received by the WTRU upon the power up of the WTRU;
   loading the initial security parameters to the C-PDCP layer;

ciphering the initial connection signaling message including the user ID using
the initial security parameters, an f8 algorithm being used for the ciphering and the initial security parameters including a ciphering key (CK), a COUNT-C value, a bearer ID, a direction value, and a length value, the COUNT-C value being a pre-arranged value; and
    transmitting the ciphered initial connection signaling message and the user ID, the initial connection signaling message including a public land mobile network (PLMN) identity.

2. The method of claim 1 wherein the initial security parameters are loaded to a universal subscriber identity module (USIM).

3. The method of claim 1 wherein the system information includes at least one public key or information for deriving a public key.

4. The method of claim 1 further comprising:
receiving an authentication request message to the WTRU including a random number and an authentication token;
authenticating the network based on the random number and the authentication token;
computing session keys and a response (RES);
sending an authentication response message including the RES to the network; and
receiving a security mode command message to the WTRU.

5. The method of claim 4 wherein the authentication response message is protected by using the initial security parameters.

6. The method of claim 4 wherein a network ciphers a downlink control message including the security mode command message with a key used for ciphering the initial connection signaling message using a symmetric encryption algorithm.

7. The method of claim 4 further comprising: configuring a user plane (U-plane) PDCP layer with a new session key for U-plane data ciphering.

8. The method of claim 1 wherein the COUNT-C value is a computed value by the WTRU and a network.

9. The method of claim 1 wherein the bearer ID is a signaling radio bearer ID number.

10. The method of claim 1 wherein the bearer ID is a pre-arranged value.

11. The method of claim 1 wherein the direction value is set to '0' for uplink.

12. The method of claim 1 wherein an asymmetric encryption algorithm is used for ciphering.

13. The method of claim 12 wherein the ciphering algorithm uses a ciphering key (CK) which is a pre-arranged public/private key-pair.

14. The method of claim 13 wherein the public key is broadcast via system information.

15. The method of claim 14 wherein the public key from a public key set comprising a plurality of public keys.

16. The method of claim 15 wherein an international mobile subscriber identity (IMSI) value is used to select an index into the public key set to select a public key.

17. The method of claim 15 wherein a FRESH value is used to select an index into the public key set to select a public key.

18. The method of claim 17 wherein the index is encrypted with a pre-agreed public key and the encrypted index is included in the initial connection signaling message.

19. The method of claim 15 wherein the system information includes a first key index seed and the connection request message includes a second key index seed, and the public key is selected using a Diffie-Hellman key exchange method.

20. The method of claim 1 wherein an f9 algorithm is used, and the initial security parameters include an integrity key (IK), a COUNT-I value, a message, a direction value, and a FRESH value.

21. The method of claim 20 wherein the IK is generated using a random number received via system information and a shared secret key K.

22. The method of claim 21 wherein the IK is generated by using f4 algorithm.

23. The method of claim 20 wherein the COUNT-I value is a pre-arranged value.

24. The method of claim 20 wherein the COUNT-I value is set to a START value stored in a universal subscriber identity module (USIM) combined with a pre-agree value.

25. The method of claim 24 wherein the pre-agreed value is a non-access stratum (NAS) layer sequence number.

26. The method of claim 20 wherein the COUNT-I value is a computed value.

27. The method of claim 20 wherein the direction value is set to '0' for uplink.

28. The method of claim 20 wherein the message is a radio bearer ID plus a first non-access stratum (NAS) message.

29. The method of claim 20 wherein the FRESH value is selected from a set of pre-arranged FRESH values.

30. The method of claim 29 wherein the IK is used to compute an index for the FRESH value.

31. The method of claim 20 wherein the FRESH value is generated by using a FRESH value generation algorithm with a random number broadcast via system information and a shared secret key K.

32. The method of claim 1 wherein the wireless communication system is a third generation (3G) long term evolution (LTE).

33. A method for security protection of a user identity (ID) in an initial connection signaling message, the method comprising:
    activating a control plane (C-plane) packet data convergence protocol (C-PDCP) layer upon power up of a wireless transmit/receive unit (WTRU);
    receiving system information upon the power up of the WTRU;
    generating initial security parameters from the system information;
    loading the initial security parameters to the C-PDCP layer;
    ciphering the initial connection signaling message including the user ID using the initial security parameters and an f8 ciphering algorithm, the initial security parameters including a ciphering key (CK), a COUNT-C value, a bearer ID, a direction value, and a length value, and the COUNT-C value being a START value stored in a universal subscriber identity module (USIM) combined with a pre-agreed value; and
    transmitting the ciphered initial connection signaling message and the user ID, the initial connection signaling message including a public land mobile network (PLMN) identity.

34. The method of claim 33 wherein the pre-agreed value is a non-access stratum (NAS) layer sequence number.

35. A wireless transmit/receive unit (WTRU) for security protection of a user identity (ID) in an initial connection signaling message, the WTRU comprising:
    a non-access stratum (NAS) layer configured to generate a first control signaling message and trigger a connection to a network;

a radio resource control (RRC) layer configured to generate a second control signaling message and perform integrity protection of the first and second control signaling messages; and a control plane (C-plane) packet data convergence protocol (C-PDCP) layer configured to perform ciphering of at least one of the first and second control signaling messages including an initial connection signaling message and the user ID using initial security parameters that are loaded to the C-PDCP layer upon power up of the WTRU and send the ciphered initial connection signaling message and the user ID to a network, the initial security parameters generated from system information received by the WTRU upon the power up of the WTRU, an f8 algorithm being used for the ciphering and the initial security parameters including a ciphering key (CK), a COUNT-C value, a bearer ID, a direction value, and a length value, the COUNT-C value being a pre-arranged value and the initial connection signaling message including a public land mobile network (PLMN) identity.

36. The WTRU of claim 35 wherein the initial security parameters are loaded to a universal subscriber identity module (USIM).

37. The WTRU of claim 35 wherein the system information includes at least one public key or information for deriving a public key.

38. The WTRU of claim 35 wherein the NAS layer is configured to authenticate the network based on a random number and an authentication token included in an authentication request message from the network, and compute session keys and send an authentication response message including a response (RES) to the network so that the network authenticates the WTRU using the RES.

39. The WTRU of claim 38 wherein the authentication response message is protected by using the initial security parameters.

40. The WTRU of claim 38 further comprising:
a user plane (U-plane) PDCP layer for processing U-plane data, the RRC layer loads a new session key to the U-plane PDCP layer for U-plane ciphering.

41. The WTRU of claim 35 wherein the COUNT-C value is a computed value by the WTRU and the network.

42. The WTRU of claim 35 wherein the bearer ID is a signaling radio bearer ID number.

43. The WTRU of claim 35 wherein the bearer ID is a pre-arranged value between the WTRU and the network.

44. The WTRU of claim 35 wherein the direction value is set to '0' for uplink.

45. The WTRU of claim 35 wherein the ciphering algorithm is an asymmetric encryption algorithm.

46. The WTRU of claim 45 wherein the ciphering algorithm uses a ciphering key (CK) which is a pre-arranged public/private key-pair between the WTRU and the network.

47. The WTRU of claim 46 wherein the public key is broadcast via system information.

48. The WTRU of claim 47 wherein the C-PDCP layer selects a public key from a public key set comprising a plurality of public keys.

49. The WTRU of claim 48 wherein the system information includes a first key index seed and the connection request message includes a second key index seed, wherein the public key is selected using a Diffie-Hellman key exchange method.

50. The WTRU of claim 47 wherein the C-PDCP layer uses the user ID to select an index into the public key set.

51. The WTRU of claim 47 wherein the C-PDCP layer uses a FRESH value to select an index into the public key set.

52. The WTRU of claim 51 wherein the C-PDCP layer encrypts the index with a pre-agreed public key and includes the encrypted index in the connection request message.

53. The WTRU of claim 35 wherein an f9 algorithm is used, and the initial security parameters include an integrity key (IK), a COUNT-I value, a message, a direction value, and a FRESH value.

54. The WTRU of claim 53 wherein the IK is generated by the WTRU using a random number received via system information and a shared secret key K.

55. The WTRU of claim 54 wherein the IK is generated by using an f4 algorithm.

56. The WTRU of claim 53 wherein the COUNT-I value is a pre-arranged value known to the WTRU and the network.

57. The WTRU of claim 53 wherein the COUNT-I value is set to a START value stored in a universal subscriber identity module (USIM) combined with a pre-agree value known between the WRU and the network.

58. The WTRU of claim 57 wherein the pre-agreed value is a non-access stratum (NAS) layer sequence number.

59. The WTRU of claim 53 wherein the COUNT-I value is a computed value by the WTRU and the network.

60. The WTRU of claim 53 wherein the direction value is set to '0' for uplink.

61. The WTRU of claim 53 wherein the message is a radio bearer ID plus a first non-access stratum (NAS) message.

62. The WTRU of claim 53 wherein the FRESH value is selected from a set of pre-arranged FRESH values between the WTRU and the network.

63. The WTRU of claim 62 wherein the IK is used to compute an index for the FRESH value.

64. The WTRU of claim 53 wherein the FRESH value is generated by using a FRESH value generation algorithm with a random number broadcast via system information and a shared secret key K.

65. The WTRU of claim 35 wherein the wireless communication system is a third generation (3G) long term evolution (LTE).

66. The WTRU of claim 35 wherein the network ciphers a downlink control message with a key used for ciphering the initial connection signaling message using a symmetric encryption algorithm.

67. A wireless transmit/receive unit (WTRU) for security protection of a user identity (ID) in an initial connection signaling message, the WTRU comprising:
a non-access stratum (NAS) layer configured to generate a first control signaling
message and trigger a connection to a network;
a radio resource control (RRC) layer configured to generate a second control
signaling message and perform integrity protection of the first and second control signaling messages; and
a control plane (C-plane) packet data convergence protocol (C-PDCP) layer
configured, at least in part, to:
perform ciphering of at least one of the first and second control signaling
messages including an initial connection signaling message and the user ID using an f8 algorithm and initial security parameters, the initial security parameters being generated from system information received upon a power up of the WTRU, and the initial security parameters being loaded to the C-PDCP layer; and
send the ciphered initial connection signaling message and the user ID to a network, the initial security parameters including at least one of a ciphering key (CK), a COUNT-C value, a bearer ID, a direction value, and a length value, and the COUNT-C value being a START value stored in a universal subscriber identity module (USIM) combined with a pre-agreed value, the initial connection signaling message including a public land mobile network (PLMN) identity.

68. The WTRU of claim 67 wherein the pre-agreed value is a non-access stratum (NAS) layer sequence number.

* * * * *